3,010,989
Patented Nov. 28, 1961

3,010,989
PRODUCTION OF TRIORGANOBOROXINES
Phillip M. Iloff, Jr., Evans City, Pa., assignor to Callery Chemical Company, Pittsburgh, Pa., a corporation of Pennsylvania
No Drawing. Filed Feb. 2, 1959, Ser. No. 790,360
17 Claims. (Cl. 260—462)

This invention relates to the preparation of organoboranes and more particularly to the preparation of triorganoboroxines and dihydroxyorganoboranes.

Organoboranes are compounds containing boron in which one or more carbon atoms of organic radicals are directly linked to a boron atom. A few such compounds have been known for some years, but the methods used for their preparation are relatively expensive, are specific in nature, and are in general unsuited to commercial operation. Organoboranes have not, therefore, achieved any substantial importance in the chemical industry. Recently, however, interest in certain organoboranes, such as the trialkylboroxines, triarylboroxines and dihydroxyorganoboranes has been revived by the discovery that such compounds possess properties which make them useful in several new applications, e.g., as fuel additives for internal combustion engines, as plasticizers, etc. New methods for the preparation of these compounds are being sought in order to make possible their economical production in large quantities.

It is, therefore, one object of this invention to provide a new method for the preparation of triorganoboroxines and dihydroxyorganoboranes which uses readily available and relatively inexpensive reactants.

Another object is to provide a method for the preparation of triorganoboroxines and dihydroxyorganoboranes which is applicable to commercial production.

A still further object is to provide a method for the preparation of these organoboranes which utilizes reactants which have properties such that they are easily handled in production quantities and which produce rapid reaction at conditions ordinarily used in the chemical process industry.

Other objects will appear from the following specification.

This invention is based upon the discovery that the reaction of a trialkoxyboroxine or a triaryloxyboroxine with a triorganoborane produces a triorganoboroxine, i.e., a trialkylboroxine or a triarylboroxine, and that a dihydroxyorganoborane is obtained upon hydrolysis of the triorganoboroxine.

Any triorganoborane corresponding to the formula $R_2BR'$, where R is an alkyl or aryl group and R' is any organic radical, may be used in the practice of this invention. R' may be the same as R, in which case the triorganoborane is a trialkylborane or a triarylborane. Such compounds, which constitute the preferred class of reactants for use in this process, include, for example, triethylborane, tripropylborane, trioctylborane, tris(chloropropyl)borane, trioctadecylborane, triphenylborane and tritolylborane. However, triorganoboranes as defined above and in which R' an organic radical different from R may also be used if desired. This class of compounds is exemplified by compounds such as diethylethoxyborane, $(C_2H_5)_2BOC_2H_5$, diphenylbutoxyborane, $$(C_6H_5)_2BOC_4H_9$$

and dioctylbutoxyborane, $(C_8H_{17})_2BOC_4H_9$, and in which R' is a lower alkoxy group includes compounds such as the boryl oxides having the general formula $R_2BOBR_2$, e.g., $[(C_3H_7)_2B]_2O$ and $(C_4H_9)_2BOCH_2CH_2OB(C_4H_9)_2$. The organo group of the trialkylboroxine or triarylboroxine produced by this method depends upon the triorganoborane used, i.e., the organo group is the same as the alkyl or aryl radical in the $R_2BR'$, without regard to the nature of the alkoxy or aryloxy substituent of the boroxine reactant. It may be noted that when triarylboranes or trialkylboranes having relatively large organo groups are used the reaction is generally carried out at higher temperatures. For example, it is preferred to carry out the reaction using tridodecylborane at temperatures of at least about 280° C.

The reaction to produce the trialkylboroxine or triarylboroxine does not proceed to any substantial extent at ordinary temperatures so that in order to achieve an appreciable reaction rate it is necessary to heat the reactants. I have found that about 80° C. is the minimum temperature at which the reaction takes place. It is preferred, however, to heat the reaction mixture to a somewhat higher temperature. While the preferred temperatures of operation depend to a large extent upon the particular reactants employed, in general temperatures of between about 230° C. and 350° C. are employed. However, any temperature up to the decomposition temperature of the reactants and products may be used if desired.

While conditions such as pressure are not critical to operability of the method described herein, the preferred temperatures of operation are in many cases above the boiling point of the reactants used. Therefore a closed system is often used to prevent losses and the autogenous pressure which develops is super-atmospheric. Such pressures do not appear to deleteriously affect the reaction; however, if desired, a reactor provided with a vent and a suitable reflux condenser may be used in place of a closed reaction vessel.

The trialkylboroxine or triarylboroxine which is the product of the reaction of a trialkoxyboroxine or a triaryloxyboroxine with a triorganoborane may be recovered and used as such or it may be hydrolyzed to produce the corresponding dihydroxyorganoborane. The hydrolysis takes place upon contact with water or a water-bearing reagent, and the dihydroxyorganoborane may be purified by filtration, extraction, recrystallization, or other conventional technique. While no particular conditions are required for the hydrolysis step, it is often desirable to use somewhat elevated temperatures, e.g., about 80° C., in order to promote a faster rate of hydrolysis, particularly when complex organo derivatives are being treated.

Recovery of the trialkylboroxine or triarylboroxine from the reaction mixture is not always necessary or desirable since the solutions as obtained may be used as such to prepare dihydroxyorganoboranes as well as other boron compounds. If the pure trialkylboroxine or triarylboroxine is desired, for example, for use as a fuel additive, plasticizer, or other application, it may easily be recovered by stripping, distillation or other method normally available in chemical practice.

The method and practice used to demonstrate this invention will be shown by the following examples. It is to be understood, however, that the details of operation are described for purposes of illustration only and are not to be construed as limitations upon the invention.

*Example 1.*—A glass reaction tube was charged with 19 millimoles of tricamphenylborane, $B(C_{10}H_{15})_3$, and 22 millimoles of trimethoxyboroxine, $B_3O_3(OCH_3)_3$. The tube was closed and heated at 250° C. for three hours. The tricamphenylboroxine, $B_3O_3(C_{10}H_{15})_3$, thus produced was then treated with approximately 25 milliliters of water for one hour. Extraction with ether yielded a white crystalline solid which when analyzed was identified as camphenyldihydroxyborane, $C_{10}H_{15}BO_2H_2$ (calculated: B, 5.9%; C, 67%; found: B, 5.6%; C, 67.8%). This product was recovered in 82.7% yield.

*Example 2.*—A mixture of 2.0 grams of tributylborane, $B(C_4H_9)_3$, and 2.10 grams of trimethoxyboroxine was heated at 250° C., and the resulting tributylboroxine, $B_3O_3(C_4H_9)_3$, was removed and hydrolyzed by shaking with excess water for three hours. Upon extraction with ether 3.21 grams of butyldihydroxyborane, $C_4H_9B(OH)_2$, were obtained. The products were identified by chemical analysis and by X-ray diffraction analysis.

*Example 3.*—5.00 grams of trinonyl borane which was prepared from propylene trimer and diborane, and 2.50 grams of trimethoxyboroxine were heated to 300° C. for two hours and the mixture then hydrolyzed with 15 milliliters of water for one hour. After extraction with ether and evaporation of the solvent, 4.04 grams of liquid dihydroxynonylborane, $C_9H_{19}B(OH)_2$, were obtained (analysis found: B, 6.9%; C, 70.5%; H, 12.8%; calculated: B, 6.35%; C, 62.8%; H, 12.2%).

*Example 4.*—In a similar run on a larger scale, 33 grams of dihydroxynonylborane were prepared (analysis: B, 6.13%; C, 65.2%; H, 12.9%).

*Example 5.*—A mixture of 1.82 grams of tricyclohexylborane, $B(C_6H_{11})_3$, and 1.33 grams of trimethoxyboroxine was heated at 250° C. for several hours. The product was tricyclohexylboroxine, $B_3O_3(C_6H_{11})_3$, to which 15 milliliters of water were added with agitation. Using ordinary recovery procedures, 1.72 grams of cyclohexyldihydroxyborane, $C_6H_{11}B(OH)_2$, were obtained, representing a 65% yield.

*Example 6.*—38.6 millimoles of tri-n-dodecylborane, $B(C_{12}H_{25})_3$, and 49.2 millimoles of trimethoxyboroxine were heated at 250° C. and then hydrolyzed with excess water. Extraction with ether yielded 18.8 grams of a white crystalline solid, identified as dodecyldihydroxyborane, $C_{12}H_{25}B(OH)_2$, by X-ray diffraction and chemical analysis.

Trimethoxyboroxine, $B_3O_3(OCH_3)_3$, is the presently preferred boroxine reactant because it is the only such compound which is available commercially. It is a colorless liquid and is easily and conveniently handled in large quantities. Moreover, as noted above, the nature of the final product is independent of the organic group on the boroxine reactant. However, any other trialkoxyboroxine or triaryloxyboroxine may also be used. Some of these compounds are, for example, triethoxyboroxine, triisopropoxyboroxine, tributoxyboroxine, triheptoxyboroxine, tridodecoxyboroxine, triphenoxyboroxine, and tris(chloroisopropoxy)boroxine. These compounds, i.e., the boroxines, are cyclic in nature. They contain six membered rings in which boron and oxygen atoms alternate; the alkoxy or aryloxy groups are attached to the boron atoms.

According to the provisions of the patent statutes, I have explained the principle and mode of practicing my invention, and have described what I now consider to be its best embodiments. However, I desire to have it understood that within the scope of the appended claims, the invention may be practiced otherwise than as specifically described.

I claim:

1. A method of producing a triorganoboroxine which comprises reacting a boroxine selected from the group consisting of trialkoxyboroxines and triaryloxyboroxines with a triorganoborane having the formula $R_2BR'$ where R is selected from the group consisting of alkyl and aryl groups and R' is selected from the group consisting of alkyl, aryl, lower alkoxy and oxydialkylboryl radicals, at temperature of at least about 80° C.

2. A method according to claim 1 in which R' is the same as R.

3. A method according to claim 1, carried out at a temperature between about 230° C. and 350° C.

4. A method of producing a trialkylboroxine which comprises reacting a trialkoxyboroxine with a trialkylborane at a temperature of at least 80° C.

5. A method according to claim 4, and carried out at a temperature between about 230° C. and 350° C.

6. A method according to claim 4 in which the trialkoxyboroxine is trimethoxyboroxine.

7. A method of producing a dihydroxyorganoborane which comprises reacting a boroxine selected from the group consisting of trialkoxyboroxines and triaryloxyboroxines with a triorganoborane having the formula $R_2BR'$ where R is selected from the group consisting of alkyl and aryl groups and R' is selected from the group consisting of alkyl, aryl, lower alkoxy and oxydialkylboryl radicals, at a temperaure of at least about 80° C., subjecting the resultant mixture to hydrolysis, and recovering the dihydroxyorganoborane thus formed.

8. A method according to claim 7 in which R' is the same as R.

9. A method according to claim 7 carried out at a temperature between about 230° C. and 350° C.

10. A method of producing an alkyldihydroxyborane which comprises reacting a trialkoxyboroxine with a trialkylborane at a temperature of at least 80° C., subjecting the resulting mixture to hydrolysis, and recovering the alkyldihydroxyborane thus formed.

11. A method according to claim 10 in which the temperature is between 230° C. and 350° C.

12. A method according to claim 10 in which said trialkoxyboroxine is trimethoxyboroxine.

13. A method according to claim 12 in which the alkyldihydroxyborane is dodecyldihydroxyborane and the trialkylborane is tridodecylborane.

14. A method according to claim 12 in which the alkyldihydroxyborane is dihydroxynonylborane and the trialkylborane is trinonylborane.

15. A method according to claim 12 in which the alkyldihydroxyborane is cyclohexyldihydroxyborane and the trialkylborane is tricyclohexylborane.

16. A method according to claim 12 in which the alkyldihydroxyborane is camphenyldihydroxyborane and the trialkylborane is tricamphenylborane.

17. A method according to claim 12 in which the alkyldihydroxyborane is butyldihydroxyborane and the trialkylborane is tributylborane.

No references cited.